United States Patent [19]

Arscott et al.

[11] 4,369,047

[45] Jan. 18, 1983

[54] GAS SEPARATION FROM CRUDE OIL

[75] Inventors: Hedley C. Arscott, Wallington; Jiri R. Nebrensky, East Molesey; Christopher J. Wilson, Carshalton, all of England

[73] Assignee: The British Petroleum Company Limited, London, England

[21] Appl. No.: 144,965

[22] Filed: Apr. 29, 1980

Related U.S. Application Data

[63] Continuation of Ser. No. 960,714, Nov. 14, 1978, abandoned, which is a continuation-in-part of Ser. No. 917,791, Jun. 22, 1978, abandoned.

[30] Foreign Application Priority Data

Jun. 23, 1977 [GB] United Kingdom ............... 26305/77

[51] Int. Cl.³ .............................................. B01D 21/26
[52] U.S. Cl. .......................................... 55/38; 55/52; 55/204; 210/512.1; 210/512.3
[58] Field of Search ....................... 55/38, 41, 52, 184, 55/201, 202, 203, 204, 450 R, 459, 426, 178, 176, 191, 192, 193; 210/788, 512.1, 512.3, 294, 188

[56] References Cited

U.S. PATENT DOCUMENTS

| | | | |
|---|---|---|---|
| 2,295,101 | 9/1942 | Dunham | 55/459 D X |
| 2,781,910 | 2/1957 | Fontein | 210/788 |
| 2,849,097 | 8/1958 | Evans | 55/426 X |
| 3,163,508 | 12/1964 | Tuck et al. | 55/204 X |
| 3,204,772 | 9/1965 | Ruxton | 55/204 X |
| 3,215,165 | 11/1965 | Broadway | 55/459 D X |
| 3,235,090 | 2/1966 | Bose et al. | 55/426 X |
| 3,437,205 | 4/1969 | Condolios | 210/788 |
| 3,516,551 | 6/1970 | Wallen et al. | 55/459 D X |
| 3,668,825 | 6/1972 | McIlvaine | 55/459 R X |
| 3,802,570 | 4/1974 | Dehne | 55/459 R X |
| 3,817,872 | 6/1974 | Evans et al. | 55/459 R X |
| 4,097,358 | 6/1978 | Wiseman | 55/204 X |

*Primary Examiner*—Frank A. Spear, Jr.
*Attorney, Agent, or Firm*—Morgan, Finnegan, Pine, Foley and Lee

[57] ABSTRACT

A foaming crude oil is separated into (i) liquid oil containing not more than 10% by volume of gas and (ii) gas containing not more than 200 parts per million of liquid oil by passing the foaming crude oil into a cyclone separator which has means for controllably adjusting the size of the inlet thereto and in which the ratio of the diameter of the vortex finder to the diameter of the vessel in the region of the inlet is from about 0.40 to 0.80, and which is also provided with a disengaging chamber and means for maintaining a minimum liquid level in said disengaging chamber.

5 Claims, 7 Drawing Figures

GAS SEPARATION FROM CRUDE OIL

This is a continuation of application Ser. No. 960,714 filed Nov. 14, 1978, now abandoned, which in turn is a continuation-in-part of application Ser. No. 917,791, filed June 22, 1978, now abandoned.

This invention relates to a separator suitable for separating oil containing gas into gas and liquid, to a separator system comprising a plurality of separators connected together in series and also to a process of effecting such a separation.

When oil is produced from a well, it is forced from the reservoir by natural pressure up the well to the surface. As the oil rises the pressure becomes less and gas associated with the oil is progressively released from solution.

After emerging from the well, it is necessary to treat the mixture of liquid oil and gas to remove the free gas and dissolved gas which is likely to come out of solution when the oil is maintained at about atmospheric pressure as, for example, during transport in a tanker.

In order to do this, large vessels known as separators have been previously employed. These are generally long, horizontally disposed cylinders containing a system of baffles, defoamers and demisters. Single stage separation, i.e. employing one vessel and multi-stage separation employing a series of vessels have both been previously employed. In the case of single stage separation some at least of the butanes and pentanes separate with the gas and other heavier components of the oil may also be lost.

This loss can be largely avoided by multistage separation in which a number of vessels are used in series, the oil passing from one vessel to the next and undergoing a successive reduction of pressure in each. In each vessel only a portion of the gas can come out of solution. As many as seven stages of separation have been used to ensure the maximum retention of butane and pentane in the liquid oil.

Such bulky and heavy equipment is suitable for use on land where space and weight criteria are not of primary importance. However, on offshore production platforms there is a considerable financial inducement to reduce the size and weight of processing equipment, and in particular, the deck area occupied.

Cyclones, that is to say, vessels which separate mixtures into the oppositely moving vortices have been previously proposed for separating gas and liquid. For example, U.K. patent specification No. 1227128 discloses a cyclone separator, which comprises a shell of circular cross-section disposed vertically and having an inlet adjacent to the upper end thereof which introduces the feed mixture tangentially to the shell where it is caused to flow along a downward helical path within the shell. The mixture separates into an inner vortex of gas and an outer vortex of liquid. The shell has an outlet for the removal of the gas from the shell and a system for removing liquid from the vortex of gas and adding it to the separated liquid. The separator is suitable for use as a gas scrubber, that is for a feed in which the continuous phase is a gas and contains minor quantities of liquid.

However, crude oil emerging from a well usually consists of a foaming mixture, the continuous phase being liquid and there is a need for a separator capable of separating such a mixture, but which is smaller than the conventional separators referred to above.

Thus, according to the present invention a separator suitable for separating a crude oil feed containing gas into gas and liquid comprises a vessel having an inlet for feed disposed so that feed introduced under a pressure gradient is caused to form a downwardly flowing vortex of enhanced liquid from which an upwardly flowing vortex of enhanced gas separates, an upper inlet for the vortex of enhanced gas comprising a pipe extending downwardly into the vessel from the top thereof herein referred to a vortex finder, a lower outlet for the enhanced liquid, the vessel having located therein below the inlet a downwardly extending conical surface for the downwardly flowing vortex of enhanced liquid, the walls of the vessel being spaced apart from the conical surface to define therebetween a chamber, herein referred to as a disengaging chamber, the volume of which is at least equal to the volume defined by the conical surface and having located in the region of the lower end of the conical surface one or more baffles to engage the downwardly flowing vortex of enhanced liquid.

The baffles can be disposed so that they lie in a vertical plane and radially with respect to the longitudinal axis of the vessel.

The conical surface can be provided by the surface of an inverted truncated cone and the baffles can be a plurality of plates extending downwardly from the lower end of the cone.

The disengaging chamber can have a wier to maintain a minimum level in the disengaging chamber, and the conical surface can extend below the level of the top of the weir to provide, in use, a liquid seal at the base of the volume defined by the conical surface.

The separator can have means for controlling the liquid level in the disengaging chamber above the top of the weir, e.g. an adjustable valve in the outlet for controlling the pressure in the outlet.

The ratio of the diameter of the vortex finder to that of the vessel in the region of the inlet can be from 0.40 to 0.80. The vortex finder can extend into the vessel below the axis of the inlet and can conveniently terminate at a level intermediate the axis of the inlet and the conical surface or can extend to the level of the upper end of the conical surface.

References in the present specification to lower, upper and vertical refer to the separator in its disposition for normal use.

The inlet to the vessel is preferably rectangular e.g., in cross section to assist tangential entry.

Since the feedrate may vary it is desirable to have means for controllably adjusting the size of the inlet comprising an adjustable shutter to restrict the inlet.

To prevent eddying from destroying the vortices created by the tangential entry at low flow rates, the shutter preferably co-operates with a baffle to provide a smoothly converging path to the restricted inlet.

If necessary, provision may be made for injecting a defoaming agent, e.g. a silicone oil, at any convenient point.

The disengaging chamber may be provided by an enlarged lower portion of the vessel.

In the case of a vessel whose horizontal section is circular the diameter of the enlarged portion may be conveniently 1.4 to 2.0 that of the upper portion.

In the present specification the volume within the vessel below where conical surface terminates is considered to be a part of the disengaging chamber.

According to one embodiment of the invention a separator system suitable for separating a feed comprising crude oil containing gas and having a gas:liquid ratio of 2.5:1 to 15:1 by volume at separation conditions into a liquid stream containing no more than 10% gas and a gas stream containing not more than 500 ppm by volume of liquid comprises a separator as hereinbefore described, the vortex finder of which is connected either to (a) a gas scrubber for removing the oil from the gas, or (b) the inlet of a second separator as hereinbefore defined.

The volume of the first separator vessel in relation to the volume of the second separator vessel can be in the range 1.5:1 to 6:1.

The purpose of the gas scrubber or second separator is to remove the droplets of liquid oil from the gas. The gas scrubber can be a vessel containing an oil wettable surface provided, for example, by steel wool, fine wire, rock wool, glass fibre or the like on which surface the droplets of oil collect. The surface can be arranged so that the droplets fall to and collect at the base of the vessel, a particularly convenient surface is provided by a woven steel wool sold under the Trade Name of Knitmesh.

The feed may also contain solids which are normally present in crude oil in the amounts in which they are normally present. Such solids are separated with the liquid oil.

According to another aspect of the invention a process for separating a feed comprising crude oil containing gas into a liquid stream and a gas stream which process comprises:

(a) passing the feed under a pressure gradient into a first separator as hereinbefore described disposed substantially vertically and forming a downwardly flowing vortex of enhanced liquid from which an upwardly flowing vortex of enhanced gas separates and collecting the enhanced liquid containing not more than 10% gas and (b) passing the enhanced gas under a pressure gradient into a second separator vessel disposed substantially vertically and forming a downwardly flowing vortex of enhanced liquid from which an upwardly flowing vortex of enhanced gas separates and combining the enhanced liquid separated in the first vessel, and withdrawing the enhanced gas from the second vessel, or (c) passing the enhanced gas into a gas scrubber to remove liquid therefrom.

The feed may have a gas/liquid ratio of from 2.5:1 to 15:1 and may optionally contain water in amount up to 50% (both amounts being by volume referred to the liquid at separation conditions) and the pressure inside the first vessel can be from 1 to 70 bar absolute and the pressure difference between the vessels can be from 0.1 to 1 bar absolute and inlet velocities to the first and second vessels can be from 6 to 250 m/sec and 50 to 250 m/sec respectively and the process can involve controlling the operating conditions within the ranges specified to obtain a separated gas containing not more than 1 ppm vol of liquid oil and a separated liquid oil containing not more than 10% gas.

In many cases it is preferred to control the inlet velocity to the vessel or both vessels in the range 5 to 100 m/sec to improve vortex formation.

The invention is illustrated with reference to FIGS. 1 to 4 of the accompanying drawings, and the following Examples.

FIG. 7 is a schematic drawing showing the various dimensions referred to.

Figure 1:
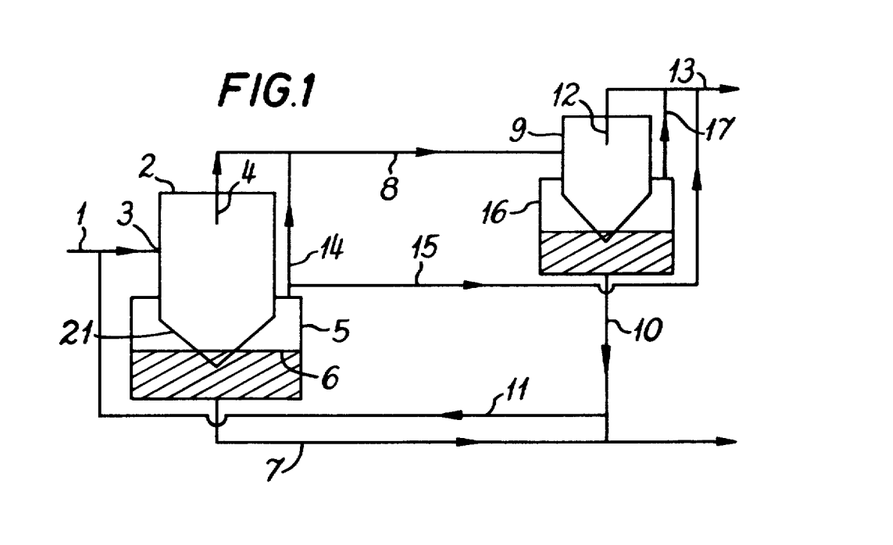
FIG. 1 is a flow diagram of a two stage separation process using two separators connected in series and FIG. 2 is a simplified flow diagram.
Figure 2:
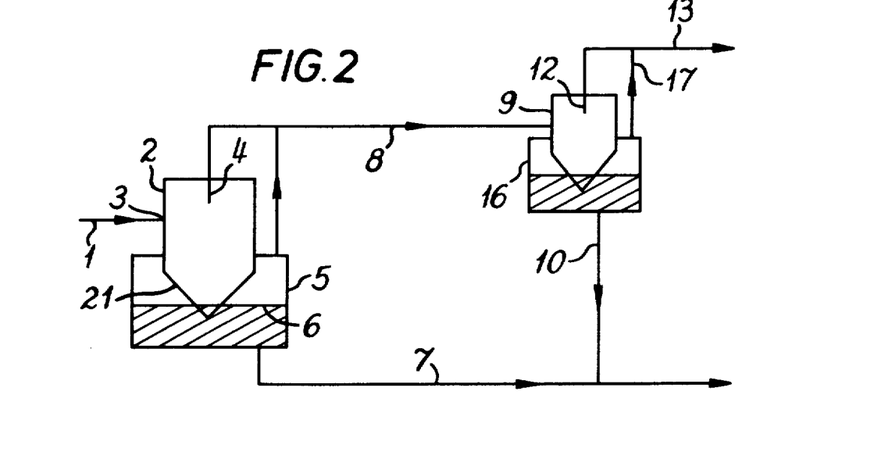

With reference to FIGS. 1 and 2 a foaming mixture of gas and oil is fed by line 1 to the first stage separator vessel 2, through a tangential inlet 3 which causes the mixture to flow in a downward helical path. The mixture separates into an outer vortex of enhanced liquid oil which spirals to the base of the vessel losing gas and an inner vortex of enhanced gas which passes upwards through the vessel losing liquid oil and is removed by a vortex finder 4.

The base of the vessel 2 forms a disengaging chamber 5 in which by means of a weir 29 (FIG. 4) liquid level 6 is maintained so that the cone outlet is immersed in the liquid oil. Degassed oil is removed from the vessel 6 by the line 7.

Gas removed from the vortex finder 4 which still contains small quantities of oil is passed by line 8 to the tangential inlet of the second stage separator vessel 9 incorporating a disengaging chamber 16.

Again, a downwardly spiralling vortex of oil is formed which is removed from the base of the vessel by the line 10. If the gas content of the liquid is below the required limit, normally 10% by volume, then the liquid is combined with the liquid product from the first stage vessel 2 in line 7. If the liquid from the chamber 16 has too high a gas content it can be recycled to the vessel 2 by the line 11 by means of a pump (not shown).

An upwardly spiralling vortex of gas is also produced in the second vessel 9 which is withdrawn by the vortex finder 12 and removed as gaseous product by the line 13.

Gas which may separate in the disengaging chamber 5 can be mixed with the feedstock to the second stage vessel 9 by the line 14 or combined with the gaseous product, if of sufficiently high quality by the line 15. Gas which separates in disengaging chamber 16 can be mixed with the gas in line 13.

Figure 4:
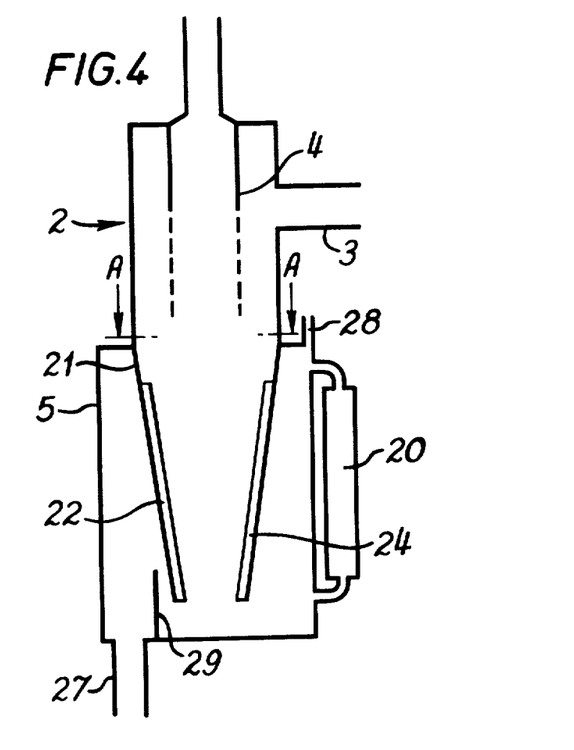
FIG. 4 is a vertical section of a separator according to the invention.
Figure 5:
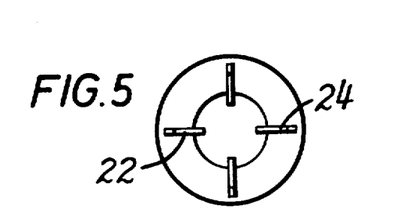
FIG. 5 is a plan view looking along A—A of FIG. 2.

Referring to FIGS. 4 and 5 the vessel 2 has a tangential inlet 3 for the incoming mixture and a vortex finder 4 for the outlet of separated gas. Below the inlet 3 the vessel 2 has a conical surface 21 to which are attached four baffles (disposed symmetrically and which converge towards the longitudinal axis of the vessel) only two of which 22 and 24 are shown in FIG. 4. Between the walls of vessel 2 and the conical surface 21 is defined disengaging chamber 5. The disengaging chamber 5 includes a weir 29 to maintain the liquid level 6 above the bottom ends of baffles 22 and 24, and a lower outlet 27 for the discharge of liquid oil. The vessel also has a liquid level indicator 20 and a pneumatic level control system (not shown) for controlling the back pressure in outlet 27 to maintain, in normal operation, the level 6 above the weir 29 and keep chamber 5 about half full of liquid. At the top of chamber 5 is an outlet 28 for gas.

Figure 3:
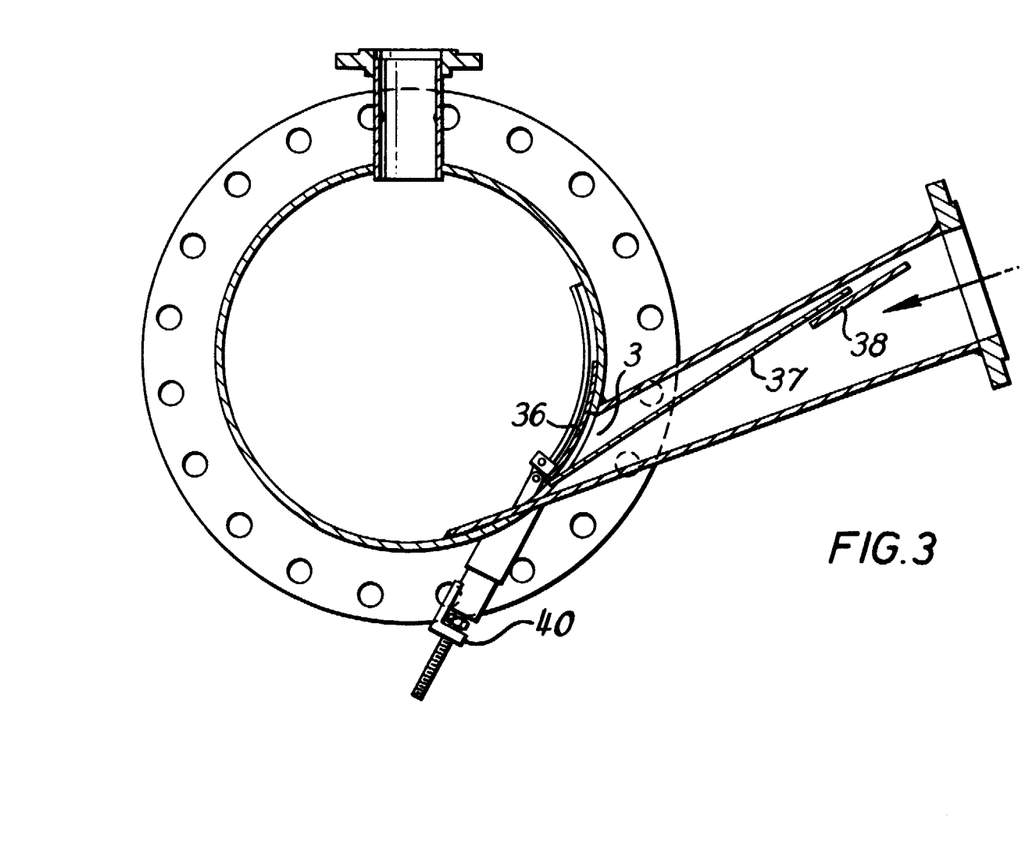
FIG. 3 is a horizontal section showing the operation of the inlet to the separator vessel.

With reference to FIG. 3, an adjustable shutter 36 is positioned adjacent to the tangential inlet 3. It is pivotally connected to a baffle 37 also pivotally connected to a slidepiece 38 within the inlet.

Position of the baffle 37 is adjusted by screw mechanism 40. In the position shown, the inlet 3 is almost completely closed off. Whether the inlet is partially open or nearly fully open, the baffle 37 ensures a smooth streamline entry to the vessel without the eddying which would take place if a portion of inflowing oil were faced with a sudden change of direction because of a sharp projection such as an unprotected shutter.

Figure 6:
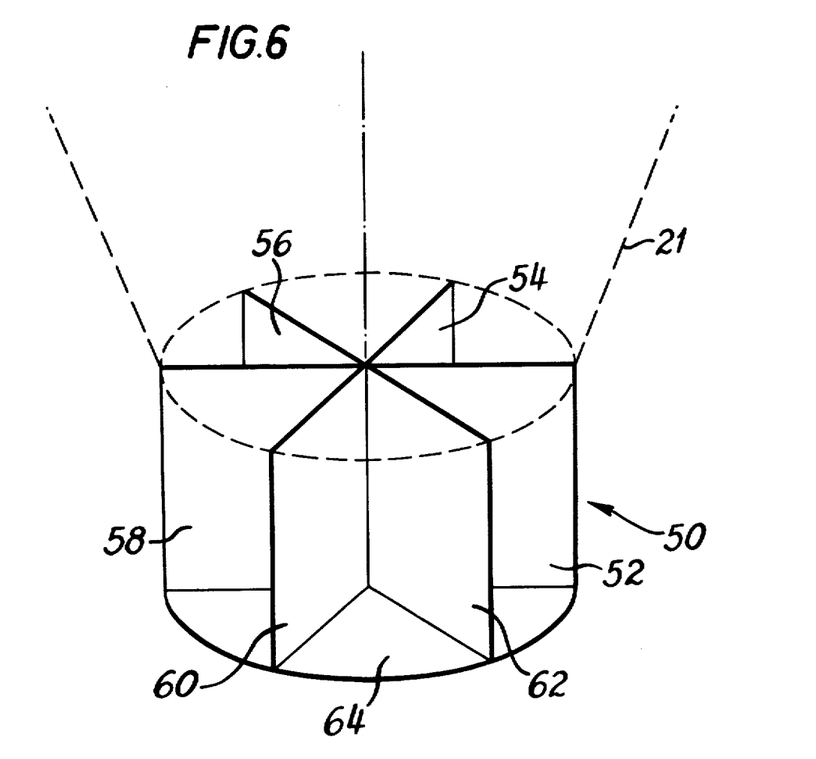
FIG. 6 is a perspective view showing an arrangement of baffles at the cone outlet otherwise the cyclone is as shown in FIG. 4.
Figure 7:
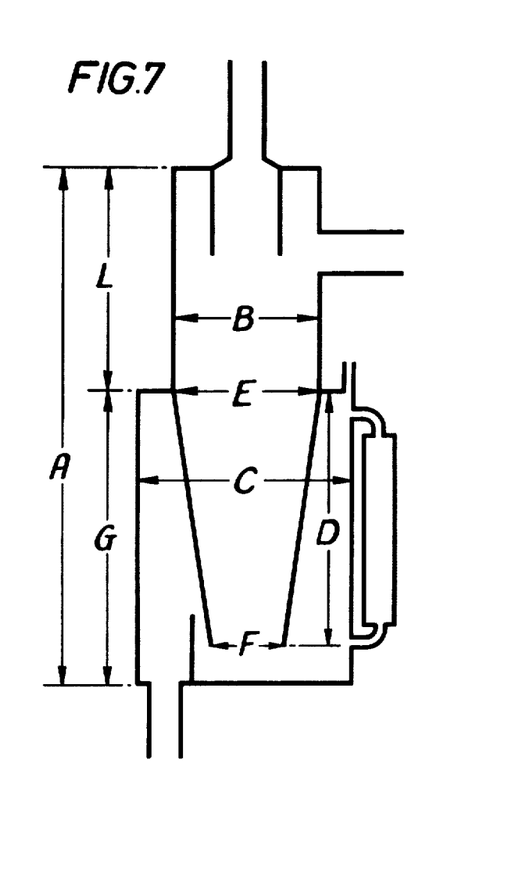

Referring to FIG. 6 the conical surface 21 has attached thereto at its lower end an arrangement of baffles indicated generally by reference numeral 50 consisting of six rectangular plates 52, 54, 56, 58, 60 and 62 disposed radially with respect to the axis of the vessel. The width of each of the plates is equal to the radius of the base of the cone and is 152 mm and the height of each plate is 160 mm. Connecting the lower edges of the plates is a horizontal circular base plate 64 of 350 mm diameter.

EXAMPLE 1

Use of two cyclones of same size in series

A laboratory scale separator system as illustrated schematically in FIGS. 2 and 4 except the vessels were the same size was employed. The dimensions of the two vessels were the same and were as follows: overall height (A) 22 cms, diameter of upper portion (B) 5.7 cms, diameter of disengaging chamber (C) 7.5 cms, cone length (D) 13 cms, diameter cone base (E) 5.7 cms, diameter of cone outlet (F) 2.5 cms, height of disengaging chamber (G) 25 cms.

The separator system was operated as described below.

Temperature throughout system 25° C.

| Feed to 1st vessel | |
|---|---|
| gas/liquid oil foam | |
| gas: liquid volume ratio 6:1 at inlet pressure. | |
| feed rate | 2643 cc/sec |
| corresponding to | 2265 cc/sec of gas and 378 cc/sec liquid |
| inlet velocity | 9.5 m/sec |
| pressure at inlet | 0.55 bars (gauge) |
| Products of 1st vessel | |
| Lower outlet: liquid containing 5% by volume of gas | |
| rate | 358 cc/sec |
| Upper outlet pressure: | 0.38 bar (gauge) |
| mist having gas: liquid ratio | 60:1 at outlet pressure |
| rate | 2559 cc/sec |
| corresponding to | 2521 cc/sec of gas and 38 cc/sec liquid |
| Feed to 2nd vessel | |
| The product from the upper outlet of the first vessel was passed to the inlet of a second vessel at the rate indicated. | |
| Products from 2nd vessel | |
| Lower outlet: liquid containing 5% by volume of gas which was combined with the liquid product from the 1st vessel | |
| rate | 40 cc/sec |
| upper outlet pressure: | 0.22 bar (gauge) |
| mist comprising gas containing | less than 200 ppm of liquid oil |
| rate | 2846 cc/sec |
| pressure at upper outlet | 0.22 bar (gauge) |

By restricting the outflow of liquid in line 7 the first vessel was operated so that the level 6 of liquid in the disengaging chamber 5 was almost halfway up the height of the chamber. This technique was also used in Examples 2, 3 and 4.

This Example illustrates that a separator system according to the present invention can separate a foaming crude oil into a gas containing less than 200 ppm of liquid oil and a liquid oil containing less than 5% gas.

EXAMPLE 2

Use of single cyclone: feed containing antifoam agent

The separator was a single vessel as illustrated in FIG. 4.

The overall height (A) of the vessel was 244 cms. The height of the disengaging chamber (G) was 160 cms and its diameter (C) 67 cms. The diameter of the cone at its base (E) was 50.8 cms and at its outlet (F) 20.3 cms. The cone length (D) was 129 cms.

The diameter of the upper portion of the vessel (B) was the same as the base of the cone.

Feed to vessel

Feed was a live crude oil which consisted of a gas/oil foam containing 4.1 ppm of a proprietary antifoam agent (a 12,000 centistokes silicone oil) available from Dow Corning as series 200, the foam having gas:liquid oil ratio of 6:1 at the inlet pressure the liquid being supplied at a rate of 11,000 bbl/day.

| Feed rate | 152,000 cc/sec |
|---|---|
| corresponding to | 130,000 cc/sec of gas and 22,000 cc/sec of liquid oil |
| inlet velocity | 94 m/sec |
| pressure at inlet | 11.0 bar (gauge) |
| Products from vessel | |
| Lower outlet: liquid oil containing 6% gas by volume | |
| rate | 23,300 cc/sec |
| upper outlet pressure: | 10.5 bar (gauge) |
| gas whose liquid oil content was less than 100 ppm at outlet pressure | |
| rate | 128,700 cc/sec |

This Example illustrates that a separator according to the present invention can separate a live crude oil into a liquid containing less than 10% vol of gas and a gas containing less than 100 ppm of liquid.

EXAMPLE 3

Use of two cyclones of different size in series

The separator system was as illustrated in FIGS. 2 and 4.

For the first vessel: overall height (A) 45 cms, diameter of upper portion of vessel (B) 7.6 cms, diameter of disengaging chamber (C) 7.6 cms, cone length (D) 20.5 cms, diameter of cone base (E) 7.6 cms, diameter of cone outlet (F) 2.5 cms, height of disengaging chamber (G) 25 cms.

For the second vessel: overall height 22 cms, diameter of upper portion 5.7 cms, diameter of disengaging chamber 7.5 cms, cone length 13 cms, diameter of cone base 5.7 cms, diameter of cone outlet 2.5 cms, height of disengaging chamber 25 cms.

| Feed to 1st vessel | |
|---|---|
| gas/liquid oil foam gas: liquid ratio of 10:1 at inlet pressure. | |
| feed rate | 280,500 cc/min |
| corresponding to | 255,000 cc/min gas and 25,500 cc/min liquid |
| inlet velocity | 553.3 m/min (9.2 m/sec) |
| inlet pressure | 1 bar (gauge) |
| Products from 1st vessel | |
| Lower outlet: liquid oil containing 3.4% gas by vol. | |
| rate | 23,911 cc/min |
| upper outlet: mist having gas: liquid ratio 112.7 | |
| rate | 269,968 cc/min |
| corresponding to | 267,593 cc/min gas 2,375 cc/min liquid |
| Feed to 2nd vessel | |

| | -continued |
|---|---|
| Entire product from upper outlet of first vessel was passed to inlet of second vessel at rate indicated. | |
| Inlet velocity | 964 m/min (16.1 m/sec) |
| Products from 2nd vessel | |
| Lower outlet: liquid oil containing less than 5% gas by vol. | |
| rate | 2,500 cc/min and combined with liquid oil from the outlet of 1st vessel. |
| upper outlet: gas containing less than 0.02% liquid | |
| rate | 282,321 cc/min |
| pressure | 0.8 bar (gauge). |

This example illustrates that a separator system according to the invention can separate a crude oil foam (containing no antifoaming agent) into a liquid oil containing less than 5% vol of gas and a gas containing less than 200 ppm of liquid oil.

EXAMPLE 4

Use of two cyclones of different size with recycle of liquid oil from second cyclone The separator system was the same as illustrated in FIG. 1. The cyclones were as illustrated in FIG. 6. The vortex finder extended as shown by the dotted lines in FIG. 4. The dimensions of the two vessels were as given in the table below.

| | | first vessel | second vessel |
|---|---|---|---|
| diameter of the upper portion and the cone base (B) and (E) | (mm) | 1020 | 510 |
| diameter of the cone outlet (F) | (mm) | 305 | 254 |
| diameter of the disengaging chamber (C) | (mm) | 1177 | 562 |
| height of the upper portion (L) | (mm) | 1525 | 1555 |
| height of the cone (D) | (mm) | 2700 | 965 |
| height of the disengaging chamber (G) | (mm) | 3610 | 1575 |

The vessels were designed for 66° C. (150° F.) and 37.2 bar absolute pressure (525 psig). Design throughput was 397 m³/hr (60,000 bbl/day) of oil.

The separator system was operated as described below.

| Feed to 1st vessel | |
|---|---|
| A live crude oil consisting of 295 m³/hr (44,600 bbl/day) of liquid oil and 500 m³/hr (294 scfm) of gas was passed at 48° C. and 32 bar absolute to the first vessel. | |
| Inlet velocity | 11.0 m/sec |
| Products from the 1st vessel | |
| Lower outlet: | 294 m³/hr of gas-oil mixture |
| containing | 7.6 vol % of gas (41,000 bbl/day of clean oil) at 48° C. |
| pressure | 30.3 bar absolute (425 psig) |
| Upper outlet: | 529 m³/hr of oily gas |
| containing | 23.8 m³/hr (3,600 bbl/day) of oil under the same conditions. |
| Feed to 2nd vessel | |
| Entire product from the upper outlet of the first vessel was passed to the inlet of the second vessel, operating at 48° C. and 29.8 bar absolute pressure (418 psig). | |
| Products from 2nd vessel | |
| Lower outlet: containing | 148 m³/hr of gas-oil mixture estimated 84 vol % of free gas under the operating conditions (3,600 bbl/day of clean oil) which was recycled as shown in FIG. 1 to the first vessel. |
| Upper outlet: | 401 m³/hr (236 cfm) of clean gas measured at 48° C. The gas contained no measurable amount |

| | -continued |
|---|---|
| | of liquid oil. |
| pressure | 28.9 bar absolute (405 psig) |

This example illustrates that a live crude oil can be separated into a liquid containing 7.6% vol of gas and a gas containing no measurable amount of liquid oil, i.e. less than 2 ppm.

We claim:

1. A process for separating a feed comprising crude oil containing gas dispersed therein so that the liquid is in the continuous phase into a liquid containing not more than 10% by volume of gas and a gas containing not more than 200 ppm by volume of liquid oil, which process comprises passing the feed under a pressure gradient into a separator, the separator comprising a vessel having an inlet for feed disposed so that feed introduced under a pressure gradient is caused to form a downwardly flowing vortex of liquid from which an upwardly flowing vortex of gas separates, the inlet having means for controllably adjusting the size thereof, an upper outlet for the vortex of enhanced gas comprising a pipe extending downwardly into the vessel from the top thereof herein referred to as a vortex finder, the ratio of the diameter of the vortex finder to the diameter of the vessel in the region of the inlet being between about 0.40 and about 0.80, a lower outlet for the liquid, the vessel having located therein below the inlet a downwardly extending conical surface for the downwardly extending conical surface for the downwardly flowing vortex of liquid, the vessel having an enlarged lower portion, the walls of the enlarged lower portion of the vessel being spaced apart from the conical surface to define therebetween a disengaging chamber, the volume of which is at least equal to the volume defined by the conical surface, the disengaging chamber having an outlet for the discharge of separated gas and means for maintaining a minimum liquid level in the disengaging chamber to reduce the gas entrainment in the liquid discharge therefrom, and wherein there is located in the region of the lower end of the conical surface one or more baffles to engage the downwardly flowing vortex of liquid, disposed substantially vertically, and collecting the liquid containing not more than 10% by volume of gas and the gas containing not more than 200 ppm by volume of liquid.

2. A process for separating a feed comprising crude oil containing gas dispersed therein so that the liquid is in the continuous phase into a liquid containing not more than 10% by volume of gas and a gas containing not more than 200 ppm by volume of liquid oil which process comprises:

(a) passing the feed under a pressure gradient into a first separator disposed substantially vertically, the first separator comprising a first vessel having an inlet for feed disposed so that feed introduced under a pressure gradient is caused to form a downwardly flowing vortex of liquid from which an upwardly flowing vortex of gas separates, the inlet having means for controllably adjusting the size thereof, an upper outlet for the vortex of gas comprising a pipe extending downwardly into the first vessel from the top thereof herein referred to as a vortex finder, the ratio of the diameter of the vortex finder to the diameter of the vessel in the region of the inlet being between about 0.40 and about 0.80, a lower outlet for the liquid, the first vessel having located therein below the inlet a downwardly extending conical surface for the downwardly flowing vortex of liquid, the vessel having an enlarged lower portion, the walls of the enlarged lower portion of the first vessel being spaced apart from the conical surface to define therebetween a disengaging chamber, the volume of which is at least equal to the volume defined by the conical surface, the disengaging chamber having an outlet for the discharge of separated gas and means for maintaining a minimum liquid level in the disengaging chamber to reduce the gas entrainment in the liquid discharge therefrom, and wherein there is located in the region of the lower end of the conical surface one or more baffles to engage the downwardly flowing vortex of liquid, and collecting the liquid containing not more than 10% by volume gas, and either (b) passing the gas under a pressure gradient into a second separator disposed substantially vertically, the second separator comprising a second vessel having an inlet for feed disposed so that feed introduced under a pressure gradient is caused to form a downwardly flowing vortex of liquid from which an upwardly flowing vortex of gas separates, the inlet having means for controllably adjusting the size thereof, an upper outlet for the vortex of gas comprising a pipe extending downwardly into the second vessel from the top thereof herein referred to as a vortex finder, the ratio of the diameter of the vortex finder to the diameter of the vessel in the region of the inlet being between about 0.40 and about 0.80, a lower outlet for the liquid, the second vessel having located therein below the inlet a downwardly extending conical surface for the downwardly flowing vortex of liquid, the vessel having an enlarged lower portion, the walls of the enlarged lower portion of the second vessel being spaced apart from the conical surface to define therebetween a disengaging chamber, the volume of which is at least equal to the volume defined by the conical surface, the disengaging chamber having an outlet for the discharge of separated gas and means for maintaining a minimum liquid level in the disengaging chamber to reduce the gas entrainment in the liquid discharge therefrom, and wherein there is located in the region of the lower end of the conical surface one or more baffles to engage the downwardly flowing vortex of liquid, and withdrawing the gas containing less than 200 ppm by volume of liquid oil from the second vessel, or (c) passing the gas into a gas scrubber to remove liquid oil therefrom and yield a gas containing less than 200 ppm by volume of liquid oil.

3. A process as claimed in claim 2 wherein the feed has a gas/liquid ratio by volume of from 2.5:1 to 15:1 and wherein the pressure inside the first vessel is from 1 to 70 bar absolute and the pressure difference between the vessels is from 0.1 to 1 bar absolute, and controlling the operating conditions to obtain a separated gas containing not more than 200 ppm volume of liquid oil and a separated liquid oil containing not more than 10% gas.

4. A process as claimed in claim 3 wherein the feed contains water in an amount up to 50% by volume.

5. A process for separating a feed comprising crude oil containing gas dispersed therein so that the liquid is in the continuous phase into a liquid containing not more than 10% by volume of gas and a gas containing not more than 200 ppm by volume of liquid oil which process comprises passing the feed under a pressure gradient into a separator, the separator comprising a vessel having an inlet for feed disposed so that feed introduced under a pressure gradient is caused to form a downwardly flowing vortex of liquid from which an upwardly flowing vortex of gas separates, the inlet having means for controllably adjusting the size thereof, an upper outlet for the vortex of enhanced gas comprising a pipe extending downwardly into the vessel from the top thereof herein referred to as a vortex finder, the ratio of the diameter of the vortex finder to the diameter of the vessel in the region of the inlet being between about 0.40 and about 0.80, a lower outlet for the liquid, the vessel having located therein below the inlet a downwardly extending surface for the downwardly flowing vortex of liquid, the vessel having an enlarged lower portion, the walls of the enlarged lower portion of the vessel being spaced apart from the downwardly extending surface to define therebetween a disengaging chamber, the volume of which is at least equal to the volume defined by the downwardly extending surface, the disengaging chamber having an outlet for the discharge of separated gas and means for maintaining a minimum liquid level in the disengaging chamber to reduce the gas entrainment in the liquid discharged therefrom, and wherein there is located in the region of the lower end of the downwardly extending surface one or more baffles to engage the downwardly flowing vortex of liquid, disposed substantially vertically, and collecting the liquid containing not more than 10% by volume of gas and the gas containing not more than 200 ppm by volume of liquid.

* * * * *